(12) United States Patent
Cieplinski

(10) Patent No.: US 6,801,657 B1
(45) Date of Patent: Oct. 5, 2004

(54) METHOD AND APPARATUS FOR REPRESENTING AND SEARCHING FOR COLOR IMAGES

(75) Inventor: Leszek Cieplinski, Surrey (GB)

(73) Assignee: Mitsubiki Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/556,799

(22) Filed: Apr. 25, 2000

(30) Foreign Application Priority Data

Apr. 29, 1999 (GB) .............................................. 9909961

(51) Int. Cl.⁷ ................................................. G06K 9/00
(52) U.S. Cl. ...................... 382/164; 382/165; 382/190; 382/209; 382/218; 382/278; 707/3; 707/6
(58) Field of Search ................................ 382/164, 165, 382/166, 167, 170, 171, 190, 191, 194, 195, 201, 209, 217, 218, 219, 220, 224, 278, 282, 287, 305; 358/512, 515, 518, 519, 527; 707/2, 3, 4, 5, 6

(56) References Cited

U.S. PATENT DOCUMENTS

| | | |
|---|---|---|
| 5,579,471 A | 11/1996 | Barber et al. |
| 5,641,596 A * | 6/1997 | Gray et al. ................... 430/21 |
| 5,652,881 A | 7/1997 | Takahashi et al. |
| 5,819,288 A * | 10/1998 | De Bonet ................... 707/104 |
| 5,852,823 A * | 12/1998 | De Bonet ...................... 707/6 |
| 5,873,080 A * | 2/1999 | Coden et al. .................. 707/3 |
| 5,899,999 A * | 5/1999 | De Bonet ................... 707/104 |
| 5,949,904 A * | 9/1999 | Delp .......................... 382/165 |
| 6,026,411 A * | 2/2000 | Delp .......................... 707/104 |
| 6,181,818 B1 * | 1/2001 | Sato et al. .................. 382/170 |
| 6,246,804 B1 * | 6/2001 | Sato et al. .................. 382/284 |
| 6,335,985 B1 * | 1/2002 | Sambonsugi et al. ....... 382/190 |
| 6,345,274 B1 * | 2/2002 | Zhu et al. ..................... 707/5 |
| 6,373,979 B1 * | 4/2002 | Wang ......................... 382/165 |
| 6,411,953 B1 * | 6/2002 | Ganapathy et al. ............ 707/6 |
| 6,477,272 B1 * | 11/2002 | Krumm et al. ............. 382/170 |

FOREIGN PATENT DOCUMENTS

| | | |
|---|---|---|
| EP | 0643358 A3 | 3/1995 |
| EP | 0643358 A2 | 3/1995 |
| EP | 0643358 A2 | 3/1995 |
| EP | 0997846 A2 | 5/2000 |
| WO | WO9931605 | 6/1999 |

OTHER PUBLICATIONS

D. Androutsos et al., "Vector Angular Distance Measure for Indexing and Retrieval of Color", vol. 3656, Jan. 1999, pp. 604–613.

(List continued on next page.)

*Primary Examiner*—Bhavesh M. Mehta
*Assistant Examiner*—Yosef Kassa
(74) *Attorney, Agent, or Firm*—Birch, Stewart, Kolasch & Birch, LLP

(57) ABSTRACT

A method of representing a colour image comprises selecting a region of the image, selecting one or more colours as representative colours for the region and, for a region having two or more representative colours, calculating for each representative colour at least two parameters related to the colour distribution in relation to the respective representative colour and using said parameters to derive descriptors for the image region.

38 Claims, 3 Drawing Sheets

OTHER PUBLICATIONS

Zaher Aghbari et al., "New Indexing Method for Content-Based video Retrieval and Clustering for MPEG Video Database", Nov. 1997, pp. 140–149.

JP–A–11–096364, Apr. 9, 1999, Abstract only.

SPIE, vol. 2670, pp. 29–40, "Color Indexing with Weak Spatial Constraints," Markus Stricker et al.

Internal Organisation of Standardisation, ISO/IEC JTC1/SC29/WG11 MPEG99/N2695, Seoul, Mar. 1999, "MPEG–7 Visual par tof eXperimentation Model Version 1.0".

S1—Proposal Id. P437, Kazuyo Ikeda et al., Canon, Inc., Proposal of MPEG–7 Still Image Description Scheme.

S2—Technical Summary of Color Descriptors for MPEG7 (p. 165–167), IBM Almaden Research Center.

S3—Internal Organization for Standardization, ISO/IEC JTC1/SC29/WG11/MPEG 99/P576 Lancaster, "Color Representation for Visual Objects," Jan. 31, 1999.

S4—Internal Organization for Standardization, ISO/IEC JTC1/SC29/WG11/P "A Color Descriptor for MPEG–7: Variable Bin Color Histogram", Feb. 1999.

S5—MPEG 7 Proposals, Kyuheon Kim.

* cited by examiner

METHOD AND APPARATUS FOR REPRESENTING AND SEARCHING FOR COLOR IMAGES

The present invention relates to a method and apparatus for representing a colour image or a region of an image for searching purposes, and a method and apparatus for searching for colour images or image regions.

Searching techniques based on image content for retrieving still images and video from, for example, multimedia databases are known. Various image features, including colour, texture, edge information, shape and motion, have been used for such techniques. Applications of such techniques include Internet search engines, interactive TV, telemedlcine and teleshopping.

For the purposes of retrieval of images from an image database, images or regions of images are represented by descriptors, including descriptors based on colours within the image. Various different types of colour-based descriptors are known, including the average colour of an image region, statistical moments based on colour variation within an image region, a representative colour, such as the colour that covers the largest area of an image region, and colour histograms, where a histogram is derived for an image region by counting the number of pixels in the region of each of a set of predetermined colours.

A known content-based image retrieval system is QBIC (query by image content) (see U.S. Pat. No. 5,579,471, MPEG document M4582/P165: Colour Descriptors for MPEG-7 by IBM Almaden Research Center). In one of the modes of operation of that system, each image in a database is divided into blocks. Each block is grouped into subsets of similar colours and the largest such subset is selected. The average colour of the selected subset is chosen as the representative colour of the respective block. The representative colour information for the image is stored in the database. A query in the database can be made by selecting a query image. Representative colour information for the query image is derived in the same manner as described above. The query information is then compared with the information for the images stored in the database using an algorithm to locate the closest matches.

MPEG document M4582/P437 and U.S. Pat. No. 5,586, 197 disclose a similar approach, but using a more flexible method of dividing an image into blocks and a different method of comparing images. In another variation, described in MPEG document M4582/P576: Colour representation for visual objects, a single value for each of two representative colours per region are used.

Several techniques for representing images based on colour histograms have been developed such as MPEG document M4582/P76: A colour descriptor for MPEG-7: Variable-Bin colour histogram. Other techniques use statistical descriptions of the colour distribution in an image region. For example, MPEG document M4582/P549: Colour Descriptor by using picture information measure of subregions in video sequences discloses a technique whereby an image is divided into high and low entropy regions and colour distribution features are calculated for each type of region. MPEG document M4852/P319: MPEG-7 Colour Descriptor Proposal describes using a mean and a covariance value as descriptors for an image region.

All the approaches described above have important shortcomings. Some of them, in particular colour histogram techniques, are highly accurate, but require relatively large amounts of storage and processing time. Other methods, such as the ones using one or two representative colours, have high storage and computational efficiency but are not precise enough. The statistical descriptors are a compromise between those two types of techniques, but they can suffer from lack of flexibility, especially in case where colours of pixels vary widely within a region.

The present invention provides a method of representing an image by approximating the colour distribution using a number of component distributions, each corresponding to a representative colour in an image region, to derive descriptors of the image region.

The invention also provides a method of searching for images using such descriptors.

The invention also provides a computer program for implementing said methods and a computer-readable medium storing such a computer program. The computer-readable medium may be a separable medium such as a floppy disc or CD-ROM or memory such as RAM.

An embodiment of the invention will be described with reference to the accompanying drawings of which:

Figure 1:
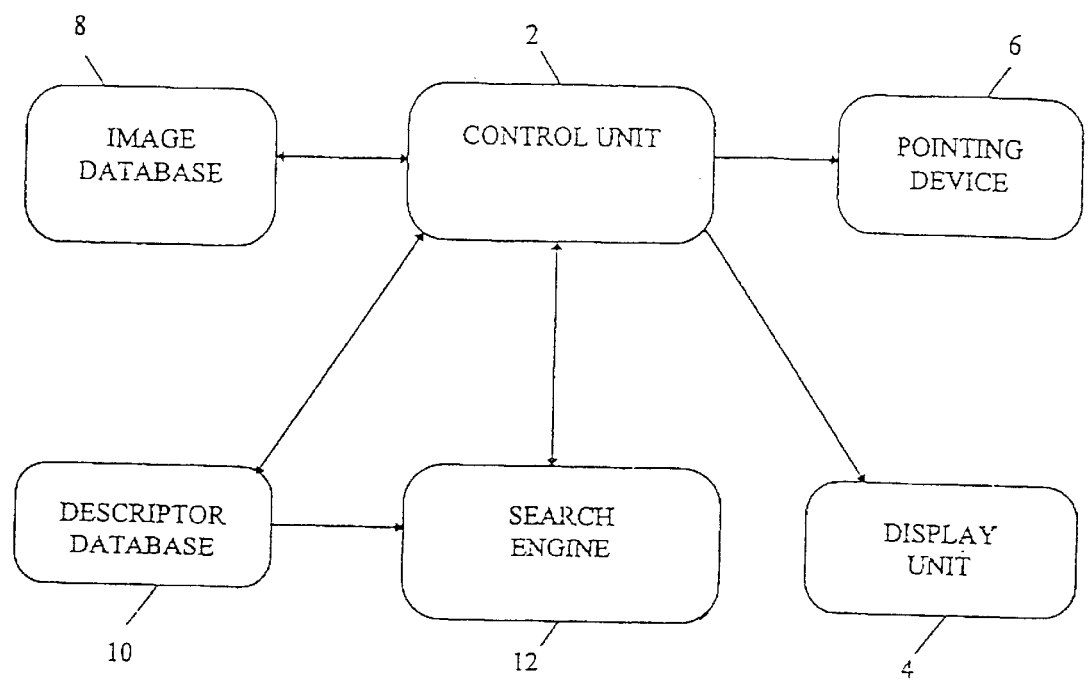
FIG. 1 is a block diagram of a system according to an embodiment of the invention.

A system according to an embodiment of the invention is shown in FIG. 1. The system includes a control unit 2 such as a computer for controlling operation of the system, a display unit 4 such as a monitor, connected to the control unit 2, for displaying outputs including images and text and a pointing device 6 such as a mouse for inputting instructions to the control unit 2. The system also includes an image database 8 storing digital versions of a plurality of images and a descriptor database 10 storing descriptor information, described in more detail below, for each of the images stored in the image database 8. Each of the image database 8 and the descriptor database 10 is connected to the control unit 2. The system also includes a search engine 12 which is a computer program under the control of the control unit 2 and which operates on the descriptor database 10.

In his embodiment, the elements of the system are provided on a single site, such as an image library, where the components of the system are permanently linked.

The descriptor database 10 stores descriptors of all the images stored in the image database. More specifically, in this embodiment, the descriptor database 10 contains descriptors for each of a plurality of regions of each image The descriptors are derived as described below.

Each image in the database 8 is divided into a number of non-overlapping rectangular blocks of pixels. For each block, a colour histogram is then derived, by selecting a predetermined number of colours, and counting the number of pixels in the block of each colour.

The colour histogram so obtained shows the colour distribution of the pixels within the block. In general, the region will have one or more dominant colours, and the histogram will have peaks corresponding to those colours.

The descriptors for the blocks are based on the dominant colours as identified from the histogram. The descriptor for each block has the following elements:

(1) The number of dominant colours, n, called the degree of the descriptor, where $n \geq 1$; and for each dominant colour:

(2)(a) a weight representing the relative significance of the respective dominant colour in the block. Here, the weight is a ratio of the number of pixels in the block of the relevant colour to the total number of pixels in the block.

(b) a mean value, $m = \begin{pmatrix} m_x \\ m_y \\ m_x \end{pmatrix}$ where x, y and z index colour components, for example the red, green and blue colour components of the colour in RGB colour space. Here, the mean value corresponds to the colour components of the respective dominant colour.

(c) a covariance matrix $C = \begin{pmatrix} c_{xx} & c_{xy} & c_{xz} \\ c_{yx} & c_{yy} & c_{yz} \\ c_{zx} & c_{zy} & c_{zz} \end{pmatrix}$ where $c_{ii}$ represents variance of colour component i and $c_{ij}$ represents covariance between components i and j. The covariance matrix is symmetrical ($c_{ij}=c_{ji}$) so only six numbers are needed to store it.

In obtaining the descriptor as discussed above, the colour distribution is treated as n different sub-distributions, where n is the number of dominant colours, each sub-distribution centring about a respective dominant colour as the mean. The ranges of the sub-distributions may well overlap, and a suitable algorithm is used to determine the range of each distribution for calculating the weight, mean and covariance matrix, as will be understood by a person skilled in the art. One way of estimating the descriptor components is to fit Gaussian functions centered at histogram peaks to the histogram by minimising the difference between the actual histogram counts and values estimated from the mixture of Gaussian functions.

The descriptor database 10 stores a descriptor as defined above for each block of each image stored in the image database 8. The representation of the colour distribution within each block using the descriptor structure described above contains a large amount of descriptive information, but requires less storage space than, for example, full histogram information.

As an example, a colour histogram for a specific block may exhibit three peaks corresponding to three dominant colours. The histogram colour distribution is analysed as three colour sub-distributions and results in a descriptor including the number three indicating the number of dominant colours, three weights, three mean vectors, corresponding to the colour vectors for the three peaks, and three corresponding covariance matrices.

The system is used to search for images in the image database using the descriptors stored in the descriptor database. The present embodiment provides two search methods: a single colour baser search and a region based search.

Figure 2:
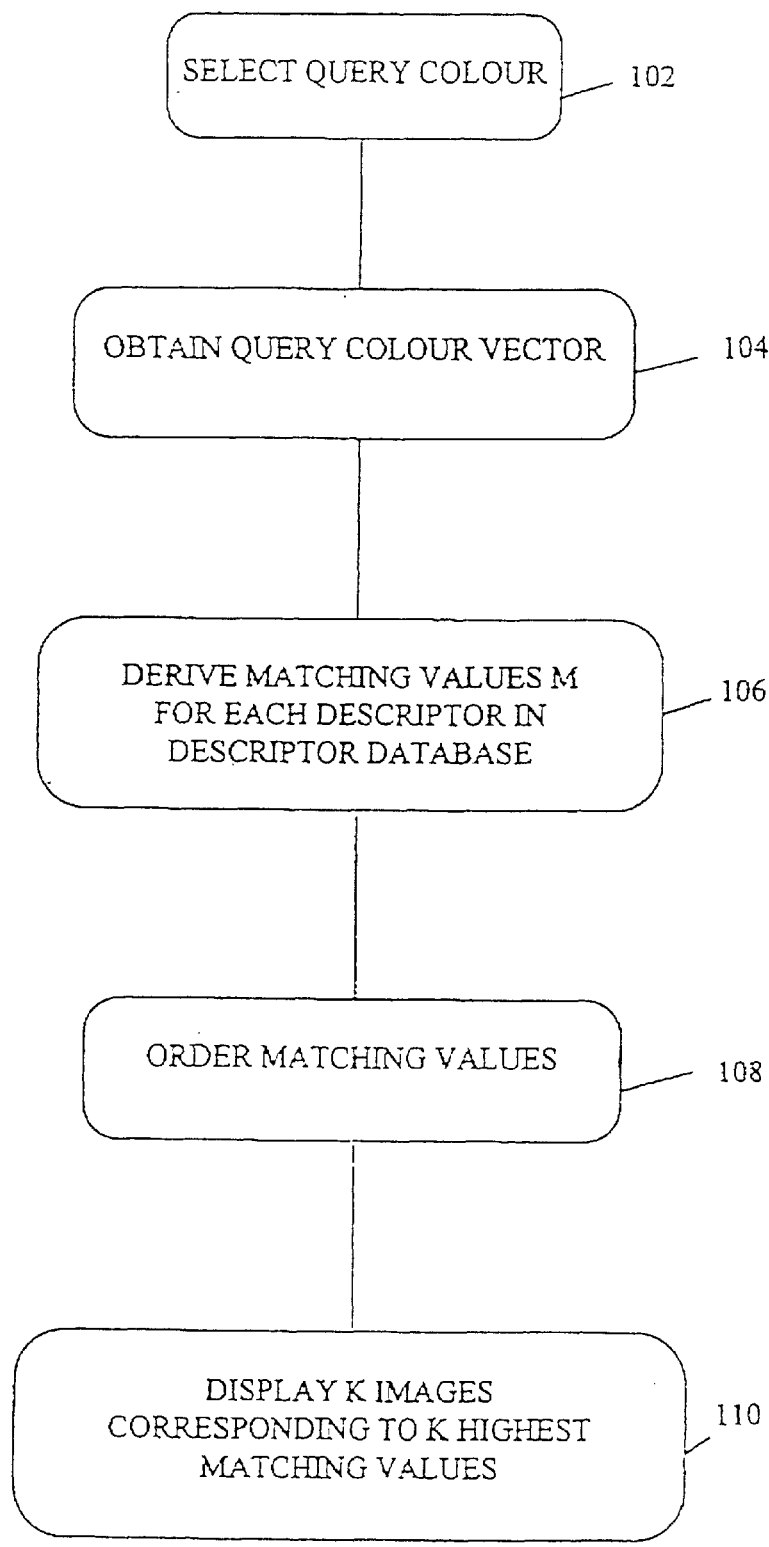
FIG. 2 is a flow chart of a first search method.

The single colour based search will be described with reference to the flowchart shown in FIG. 2.

In the single colour based search the user inputs a query by selecting a colour to be searched, using the pointing device 6 and a menu such as a colour wheel or a palette displayed on the display unit 4 (step 102). The control unit 2 then obtains the corresponding colour vector for the query colour, the colour vector having components which are the respective colour components for the query colour, that is, the red, green and blue components (step 104).

The control unit 2 then uses the search engine 12 to search for images in the image database 8 that include the query colour. The search engine 12 perform, a matching procedure using tie query colour vector and the descriptors for the image blocks in the descriptor database 10 (step 106)

The matching procedure is performed using the following formula for calculating a matching value M.

$$M = \exp\left[-\frac{1}{2}(q-m)^T C^{-1}(q-m)\right]$$

where q is the query colour vector. A matching value is calculated for each dominant colour in each block using each value of m and C in the descriptor for the block. Thus, for a descriptor of degree n, n matching values are obtained.

The matching value can be considered as the value of the probability density function corresponding to each colour sub-distribution in the block at the point defined by the query colour value, modelling, the probability density function as a Gaussian function.

For a given descriptor, the larger a matching value M, the closer the corresponding block is to a match with the selected colour.

When matching values have been calculated for each descriptor in the descriptor database 10, the search engine 12 orders the results by the size of M staring with the largest values of M, considering only the largest value of the for any descriptors of degree greater than one (step 108).

The control unit 2 takes the results of the matching procedure from the search engine 12, and retrieves from, the image database a predetermined number K of those images which are the closest matches, corresponding to the K highest values of M. Those images are then displayed on the display unit 4 (step 110). The set-up of the control unit 2 determines how many of the closest matches are to be displayed on the display unit. That number can be changed by the user.

As will be understood from the above description, the single colour based search retrieves images from the image database 8 which have a block which has a dominant colour which is the same as or close to the colour initially selected by the user.

Figure 3:
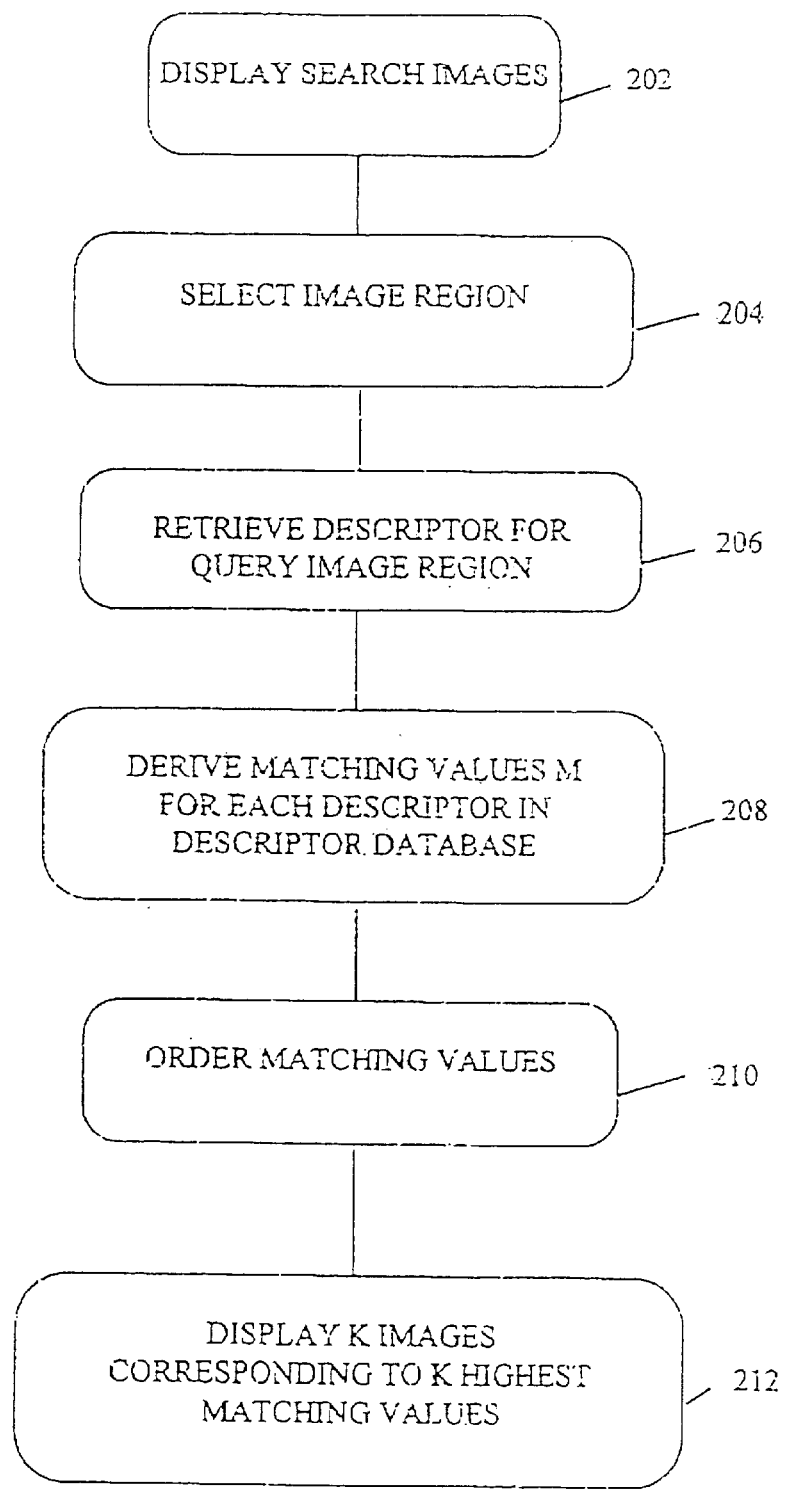
FIG. 3 is a flow chart of a second search method.

The region based search will be described with reference to the flowchart shown in FIG. 3.

In the region based search, the control unit 2 operates to display a predetermined set of search images, which are images from the image database 8, on the display unit 4 (step 202). The search images may be wholly determined by the set-up of the control unit, or may depend on other requirements input by the user. For example, in a larger system supporting keyword-based searches the user might input the word "leaves" which would result in a predetermined set of images depicting leaves being shown as the images for colour based search.

Each of the search images is shown with a grid dividing the image into blocks, corresponding to blocks for which the descriptors have been derived The user then selects, using the pointing device 6, a block on one of the images which shows a colour distribution of interest (step 204).

The control unit 2 then retrieves the descriptor for the selected image block from the descriptor database 10 and uses it as a query descriptor (step 206). The descriptor is already available because the search images are taken from the image database 8. The search engine then performs a search comparing that query descriptor with the other descriptors stored in the descriptor database using matching functions (step 208).

For a query descriptor having a mean value $m_a$ and covariance matrix $C_a$ for one of the dominant colours and another descriptor having a mean value $m_b$ and covariance matrix $C_b$ for one of the dominant colours, a matching function is defined as:

$$m_s(a, b) = \int \exp\left[-\frac{1}{2}(q-m_a)^T C_a^{-1}(q-m_a)\right] \exp\left[-\frac{1}{2}(q-m_b)^T C_b^{-1}(q-m_b)\right] dq$$

where q is a 3-d vector akin to a colour vector and where the integral is calculated over the range from (0, 0, 0) to (255, 255, 255) where 255 is the maximum value of a colour component. The range of the integral in other embodiments will depend upon the colour co-ordinate system and representation used.

This is equivalent to modelling the corresponding colour sub-distributions for the image blocks as probability mass functions in the form of Gaussian functions, and determining the degree to which they overlap, or in other words determining the similarity between them. The larger the result of the above calculation, the closer are the corresponding colour distributions. In this case, the function determines the degree to which a colour sub-distribution in the query image block and a colour sub-distribution in a stored image overlap.

The full matching function for matching one descriptor with another is defined as:

$$m_f = \sum_{i,j} v_i w_j m_s(i, j)$$

where v and w are weights for sub-distributions, and the summation is over all sub-distributions in both regions.

Thus, for each dominant colour described in the descriptor of a query image block, a matching value is calculated with respect to each dominant colour in a descriptor from the descriptor database 10. The resulting matching values are weighted and then sum, med to give a final matching value corresponding to $m_f$.

Full matching values are calculated as described above for all descriptors in the database with respect to the query descriptor. As in the single colour based search, the results are ordered (step 210), and the K images with the highest matching values, indicating the closest matches, are displayed on the display unit for the user (step 212).

A further iteration of a search can be performed by selecting an image region in an image found in the previous search.

A system according to the invention may, for example, be provided in an image library. Alternatively, the databases may be sited remote from the control unit of the system, connected to the control unit by a temporary link such as a telephone line or by a network such as the internet. The image and descriptor databases may be provided, for example, in permanent storage or on portable data storage media such as CD-ROMs or DVDs.

In the above description, the colour representations have been described in terms of red, green and blue colour components. Of course, other representations can be used, such as a representation using a hue, saturation and intensity, or YUV co-ordinate system, or a subset of colour components in any colour space, for example only hue and saturation in HSI.

The embodiment of the invention described above uses descriptors derived for rectangular blocks of images. Other sub-regions of the image could be used as the basis for the descriptors. For example, regions of different shapes and sizes could be used. Alternatively, descriptors may be derived for regions or the image corresponding to objects, for example, a car, a house or a person. In either case, descriptors may be derived for all of the image or only part of it.

In the search procedure, instead of inputting a simple colour query or selecting an image block, the user can, for example, use the pointing device to describe a region of an image, say, by encircling it, whereupon the control unit derives a descriptor for that region and uses it for searching in a similar manner as described above. Also, instead of using images already stored in the image database for initiating a search, an image could be input into the system using, for example, an image scanner or a digital camera. In order to perform a search in such a situation, again the system first derives descriptors for the image or regions of the image, either automatically or as determined by the user.

Appropriate aspects of the invention can be implemented using hardware or software.

In the above embodiments, the component sub-distributions for each representative colour are approximated using Gaussian functions, and the mean and covariances of those functions are used as descriptor values. However, other functions or parameters can be used to approximate the component distributions, for example, using basis functions such as sine and cosine, with descriptors based on those functions.

What is claimed is:

1. A method of representing a color image, comprising:
    selecting two or more colors as representative colors for the image or a region of said image;
    calculating for each representative color a parameter related to the color variance in relation to the respective representative color for said image or the image region having two or more representative colors;
    calculating for each representative color a weight parameter representing the relative significance of the representative color in the image or image region, based on a ratio of the number of pixels corresponding to the representative color relative to the number of pixels in the image or image region; and
    using said parameters to derive a descriptor for said image or image region, said descriptor including the parameter related to the corresponding color variance and the weight parameters.

2. A method as claimed in claim 1 comprising storing said descriptor in data storage means.

3. A method as claimed in claim 1 wherein the step of selecting representative colors comprises deriving a color histogram for the image or image region.

4. A method as claimed in claim 3 wherein the step of selecting representative colors comprises identifying local peaks in the color histogram and selecting the corresponding colors as representative colors.

5. A method as claimed in claim 4 wherein the local peaks are treated as mean values and the variances are calculated with respect to said mean values.

6. A method as claimed in claim 1 wherein the image or the image region is independent of the image content.

7. A method as claimed in claim 6 wherein the image or the image region is a polygon.

8. A method as claimed in claim 1 wherein the image or the image region corresponds to an object.

9. A method for searching for color images in data storage means comprising:
    inputting a query relating to color of an image,
    comparing said query with descriptors for stored images derived in accordance with a method as claimed in claim 1 using a matching function, and
    selecting and displaying at least one image for which the matching function indicates a close match between the query and at least part of the image.

10. A method as claimed in claim 9 wherein inputting a query comprises selecting a query image or a region of said image and obtaining the derived descriptors for said image or image region and wherein the matching function uses the descriptors for the query and for the stored images.

11. A method as claimed in claim 9 wherein the matching function is based on $M=\exp[(-\frac{1}{2})(q-m)^T C^{-1}(q-m)]$ where q is a color vector corresponding to a query and m and C are descriptor values representing first and second central moments of the color distribution for a representative color.

12. A method as claimed in claim 9 wherein the matching function is based on $$m_f = \Sigma_{i,j} v_i w_j m_s(i,j)$$

where $$m_s(a,b) = \int \exp[(-\frac{1}{2})(q-m_s)^T C_a^{-1}(a-m_a)] \exp[(-\frac{1}{2})(q-m_b)^T C_b^{-1}(q-m_b)] dq$$

and where m and C are descriptor values representing first and second central moments for color distributions for representative colors.

13. A method as claimed in claim 9 wherein a query is selected from a plurality of images displayed on display means.

14. A method as claimed in claim 9 wherein inputting a query comprises selecting a single color value.

15. A method as claimed in claim 9 wherein inputting a query comprises specifying one or more component distributions.

16. A method as claimed in claim 9 wherein a query is input using only some of the components of the color space.

17. An apparatus for implementing a method according to claim 1.

18. A computer system programmed to operate according to a method as claimed in claim 1.

19. A computer program for implementing a method as claimed in claim 1.

20. A computer-readable medium storing computer-executable process steps for implementing a method as claimed in claim 1.

21. The method of claim 1, further comprising:
selecting the image or image region.

22. The method of claim 1 wherein each weight parameter specifies percentage of pixels in the image or image region that have associated representative color.

23. A method of representing a color image by processing signals corresponding to said image, the method comprising:
identifying a number of representative colors for said image or a region of said image,
deriving a function approximating the color variance corresponding to each representative color for said image or the image region having two or more representative colors,
calculating for each representative color a weight parameter representing the significance of the representative color in the image or image region, based on a ratio of the number of pixels associated with the representative color relative to the number of pixels in the image or image region, and
using said functions and said weight parameters to define a color description of said image or image region.

24. A method for representing an image, comprising:
determining at least two dominant colors for an image or a region of said image; and
determining a color variance and a weight parameter representing the significance of the dominant color in the image or image region based on the number of pixels corresponding to the dominant color in the image or image region for each dominant color to generate a color descriptor based on pixels within said image or the image region, said color descriptor including at least two parameters related to the corresponding color variances and at least two weight parameters.

25. The method of claim 24, further comprising:
storing said color descriptor as a description for said object in a memory.

26. The method of claim 24, further comprising:
selecting the image or image region.

27. A method for representing an image, comprising:
determining at least two dominant colors for an image or a region of said image; and
determining a color distribution with respect to each dominant color, using factors for each dominant color including a weight factor based on the ratio of the number of pixels corresponding to the dominant color to the total number of pixels in said image or image region, a dominant color factor, and a color variance factor, to generate a color descriptor for said image or image region.

28. The method of claim 27, further comprising:
storing said color descriptor as a description for said image or image region in a memory.

29. A method for searching for an image, comprising:
receiving an input including at least one image;
determining at least two dominant colors for the input image or a region of said input image;
determining at least two color variances with respect to the corresponding dominant color and weight parameters representing the significance of each dominant color within the image or image region based on a ratio of the number of pixels corresponding to the dominant color relative to the number of pixels in the image or image region to generate a color descriptor based on pixels within said image or the image region;
comparing said color descriptor for said input image to a color descriptor for an image stored in memory to find at least one substantially matching image; and
displaying said at least one substantially matching image.

30. A method for propagating a signal, comprising:
generating a signal including a plurality of images;
encoding said images onto said signal using a description language to define at least a color descriptor generated using a predetermined algorithm, including a plurality of fields, for at least one selected image wherein said fields include fields representing the color space description, color variance description, and dominant color weight description for said image.

31. A system for representing an image, comprising:
a detector for determining at least two dominant colors for an image or a region of said image;
a controller for determining a color variance and a weight parameter representing the significance of the dominant color relative to other colors within the image or image region, based on a ratio of the number of pixels corresponding to the dominant color relative to the number of pixels in the image or image region for each dominant color to generate a color descriptor based on pixels within said image or the image region; and
a memory for storing said color descriptor as a description for said image or image region in a memory.

32. A system for representing an image, comprising:

a detector for determining at least two dominant colors for an image or a region of said image;

a controller for determining a color distribution with respect to each dominant color, using factors for each dominant color including a weight factor based on the ratio of the number of pixels corresponding to the dominant color to the total number of pixels in said image or image region, a dominant color factor, and a color variance factor, to generate a color descriptor for said image or image region; and a memory for storing said color descriptor as a description for said image or image region in a memory.

33. A system for searching for an image, comprising:

an input device for inputting at least one image;

a detector for determining at least two dominant colors for said input image or a region of said input image;

a controller for determining a color variance with respect to each dominant color and weight parameters representing the significance of each dominant color relative to other colors in the image or image region based on a ratio of the number of pixels corresponding to the dominant color relative to the number of pixels in the image or image region for generating a color descriptor based on pixels within said image or image region;

a comparator for comparing said color descriptor for said input image to a color descriptor for an image stored in memory to find at least one substantially matching image; and a display for displaying said at least one substantially matching image.

34. A machine-readable medium having stored thereon a plurality of executable instructions, the plurality of instructions comprising instructions to:

determine at least two dominant colors for an image or a region of said image;

determine a color variance with respect to each dominant color and weight parameters representing the significance of each dominant color relative to other colors in the image or image region based on a ratio of the number of pixels corresponding to the dominant color relative to the number of pixels in the image or image region to generate a color descriptor based on pixels within said image or the image region; and store said color descriptor as a description for said image or image region in a memory.

35. A machine-readable medium having stored thereon a plurality of executable instructions, the plurality of instructions comprising instructions to:

determine at least two dominant colors for an image or a region of said image;

determine a color distribution with respect to each dominant color, using factors for each dominant color including a weight factor based on the ratio of the number of pixels corresponding to the dominant color to the total number of pixels in said image or image region, a dominant color factor, and a color variance factor, to generate a color descriptor for said image or image region; and store said color descriptor as a description for said image or image region in a memory.

36. A machine-readable medium having stored thereon a plurality of executable instructions, the plurality of instructions comprising instructions to:

receive an input including at least one image;

determine at least two dominant colors for said input image or a region of said input image; and determine a color variance with respect to each dominant color and weight parameters representing the significance of each dominant color relative to other colors in the image or image region based on a ratio of the number of pixels corresponding to the dominant color relative to the number of pixels in the image or image region to generate a color descriptor based on pixels within said image or the image region;

compare said color descriptor for said input image to a color descriptor for an image stored in memory to find at least one substantially matching image; and display said at least one substantially matching image.

37. A method of representing a color image, comprising:

selecting two or more colors as dominant colors for an image;

for each dominant color, calculating the variance of the color distribution of the image in color space relative to the dominant color and weight parameters representing the significance of each dominant color relative to other colors in the image or image region based on a ratio of the number of pixels corresponding to the dominant color relative to the number of pixels in the image or image region; and representing the image in terms of the color space value of each dominant color and the value of the respective color variance.

38. A method of representing a color image, comprising:

deriving a color histogram for an image region to determine two or more dominant colors;

calculating a parameter relating to variance of the two or more representative colors within the image region to represent the image;

calculating for each representative color a weight parameter representing the relative significance of the representative color in the image or image region, based on a ratio of the number of pixels corresponding to the representative color relative to the number of pixels in the image or image region; and using said parameters and histogram to derive a descriptor for said image or image region, said descriptor including the parameter related to the corresponding color variance and the weight parameters.

* * * * *